2,972,514
AMMONIUM PERCHLORATE MANUFACTURING PROCESS

Harold W. Ritchey, Huntsville, Ala., assignor to Thiokol Chemical Corporation, Trenton, N.J., a corporation of Delaware No Drawing. Filed June 9, 1958, Ser. No. 740,532

5 Claims. (Cl. 23—85)

This invention relates to the manufacture of ammonium perchlorate and more particularly to a novel process for producing ammonium perchlorate having improved properties for use in rocket propellants.

There is at present a considerable demand for ammonium perchlorate of high purity for use as an oxidizer in solid rocket propellants. It has been previously proposed that ammonium perchlorate be prepared by reacting sodium perchlorate and ammonium chloride in aqueous solution to produce ammonium perchlorate and sodium chloride. Ammonium perchlorate has a temperature gradient of solubility that is substantially greater than that of sodium chloride and this difference in solubility has been utilized in a number of known processes for separating these two products. However, the solubilities of ammonium perchlorate and sodium chloride are sufficiently similar so that multiple separation steps and in some cases fractional crystallization of the ammonium perchlorate product are required in order to recover from the aqueous solution of the mixed salts an ammonium perchlorate having the requisite purity.

In cases where the ammonium perchlorate is to be incorporated in a rocket propellant the previous processes are subject to the further disadvantage that the ammonium perchlorate crystals produced contain occluded water. This occluded water tends to cause caking of the product in storage and processing difficulties in the manufacture of propellants. For example, in order to produce propellants having predetermined burning rates, accurate control of the particle size of the oxidizer is important. The presence of water in the ammonium perchlorate crystals tends to block the orifices in the pulverizing and sizing equipment used to comminute the oxidizer to the desired particle size, thus impeding control of the particle size. Also solid propellant compositions commonly contain polymerizable components and the water associated with the ammonium perchlorate may act detrimentally as a polymerization catalyst in the propellant mixture.

It is accordingly an object of the present invention to provide an improved process for the manufacture of ammonium perchlorate. It is another object of the invention to provide a process for producing relatively pure ammonium perchlorate that comprises fewer steps than have previously been required to produce ammonium perchlorate of comparable purity. It is still another object of the invention to provide a commercially feasible process for producing ammonium perchlorate crystals substantially free from occluded water. Other objects of the invention will be in part obvious and in part pointed out hereafter.

In accordance with the present invention the foregoing objects are achieved by utilizing liquid anhydrous ammonia as a reaction medium. Potassium perchlorate and ammonium chloride are dissolved in liquid ammonia and caused to react therein to produce ammonium perchlorate and potassium chloride. It has been found that potassium chloride has a very low solubility in this reaction medium and that substantially all of the potassium chloride formed precipitates, particularly when the reaction is carried out at a somewhat reduced temperature. The precipitated potassium chloride is separated from the reaction mixture by filtration and the ammonium perchlorate is then recovered by evaporation of the ammonia solution to dryness or by cooling the solution to cause ammonium perchlorate to crystallize therefrom. The reaction may be represented by the following equation:

$$KClO_4 + NH_4Cl \rightarrow NH_4ClO_4 + KCl$$

The reaction may be carried out satisfactorily over a fairly wide temperature range, i.e. $-35°$ to $+50°$ C. However, optimum separation of the products appears to occur in the neighborhood of $0°$ C. As indicated by the examples given hereafter the reaction may be carried out at atmospheric pressure or at elevated pressures.

While the proportions of the reactants may be varied if desired, there does not appear to be any advantage in departing from the theoretical proportions indicated by the equation given above. Accordingly approximately equi-molar quantities of potassium perchlorate and ammonium chloride are preferably used.

In carrying out the reaction the potassium perchlorate and ammonium chloride are dissolved in liquid ammonia, and the solution is stirred until the reaction is complete. A relatively concentrated solution is desirably used so that the concentration of ammonium perchlorate in the reaction mixture is close to the saturation value at the operating temperature employed. Since the reaction proceeds rapidly, only a few minutes' stirring is required to ensure precipitation of the potassium chloride that is formed.

The precipitated potassium chloride is separated by filtration and the filtrate is treated to recover ammonium perchlorate therefrom. Recovery of the ammonium perchlorate is usually effected by evaporating the ammonia solution to dryness, although cooling of the filtrate to a relatively low temperature, e.g. $-30°$ C. to $-70°$ C. or partial evaporation of the filtrate or various combinations of partial evaporation and cooling may be used.

The purity of the product may be improved by one or more fractional crystallization steps. For example, if the initial reaction is carried out at about $0°$ C. the filtrate may be caused, by evaporation of ammonia therefrom, to come to equilibrium at atmospheric temperature, whereupon a further precipitate is formed. The solution is then filtered to remove this second precipitate and the resulting filtrate is evaporated to dryness to recover ammonium perchlorate.

In order to point out more fully the nature of the present invention the following specific examples are given of an illustrative method of carrying out the present process.

Example 1

One-half mole (26.8 g.) of ammonium chloride and one-half mole (69.3 g.) of potassium perchlorate were added to 11.7 moles (200 g.) of liquid anhydrous ammonia and the resulting mixture was brought to a temperature of about $0°$ C. After stirring for five minutes, the mixture was filtered. The filtrate was allowed to warm to room temperature ($26°$ C.), with evaporation of ammonia, leaving a solution saturated with the solutes and having a vapor pressure of one atmosphere at $26°$ C., and the mixture was filtered again to remove salts that had precipitated during the warming process. The filtrate was evaporated to dryness and the residue dried at $100°$ C. for one hour.

The chloride content of the product expressed as potassium chloride was 4.2%, and the perchlorate content expressed as ammonium perchlorate was 95.7%.

Example 2

The apparatus used comprised a closed stainless steel pressure reactor which contained a stirrer and a filter disc cemented to an exit conduit leading from the bottom of the reactor. The exit conduit contained a shut-off valve. 2 moles (107.0 g.) of ammonium chloride and 2 moles (277.1 g.) of potassium perchlorate were introduced into the reactor. 21.8 moles (371.0 g.) of liquid anhydrous ammonia were charged into the reactor slowly to dissolve the salts therein. The reactor was then sealed and the reaction carried out under autogenous pressure. More particularly, the mixture in the reactor was stirred until the pressure reached approximately 40 p.s.i. water at room temperature (26° C.) being circulated about the reactor during this time to maintain the temperature constant. The valve in the exit conduit was then opened to cause the solution to flow out of the reactor through the filter disc and the filtrate was collected in a container located beneath the reactor. The filtrate was evaporated to dryness and a sample dried in an oven at 100° C.

Analysis of the sample showed that it had a perchlorate content, expressed as ammonium perchlorate, of 93.1%.

Example 3

0.2 mole (10.6 g.) of ammonium chloride and 0.2 mole (27.6 g.) of potassium perchlorate were added to a reaction vessel containing 11.7 moles (200 g.) of liquid anhydrous ammonia. The temperature was controlled at −35° C. After thorough mixing the product was filtered through a funnel containing glass wool and packed in Dry Ice. The ammonia was removed from the filtrate by evaporation to dryness, and the residue was heated in an oven for one hour at 110° C. Analysis showed that the residue contained 90.0% perchlorate, expressed as ammonium perchlorate.

Example 4

0.5 mole (26.7 g.) of ammonium chloride, 0.5 mole (69.3 g.) of potassium perchlorate, and 11.7 moles (200 g.) of liquid anhydrous ammonia were placed in a reaction vessel and maintained at −33° C. The mixture was stirred and then filtered. The ammonia was removed by evaporation of the filtrate to dryness. The residue was dried at 110° C. for an hour. The perchlorate content expressed as ammonium perchlorate was 92.1%.

Example 5

0.2 mole (10.6 g.) of ammonium chloride, 0.2 mole (27.6 g.) of potassium perchlorate, and 5.9 moles (100 g.) of liquid anhydrous ammonia were placed in a reaction vessel and maintained at −33° C. The mixture was filtered after stirring and the filtrate cooled to −69° C. with further stirring. The filtrate was then filtered again and the second filtrate evaporated to dryness. A sample of the resulting ammonium perchlorate was dried at 110° C. for one hour. Analysis gave a perchlorate content expressed as ammonium perchlorate of 94.1%.

It is of course to be understood that the foregoing examples are intended to be illustrative only and that numerous changes can be made in the ingredients, proportions and conditions specifically mentioned without departing from the spirit of the invention as set forth in the appended claims.

I claim:

1. The method of making ammonium perchlorate substantially free of occluded water and of at least 90 percent purity which comprises reacting potassium perchlorate and ammonium chloride in solution in liquid anhydrous ammonia to form ammonium perchlorate and to precipitate potassium chloride, separating the precipitated chloride from the ammonia solution, and recovering ammonium perchlorate from said solution.

2. The method of making ammonium perchlorate substantially free of occluded water and of at least 90 percent purity which comprises reacting potassium perchlorate and ammonium chloride in solution in liquid anhydrous ammonia at about 0° C. to form ammonium perchlorate and to precipitate potassium chloride, separating the precipitated chloride from the ammonia solution, and recovering ammonium perchlorate from said solution.

3. The method of making ammonium perchlorate substantially free of occluded water and of at least 90 percent purity which comprises reacting potassium perchlorate with ammonium chloride in liquid anhydrous ammonia solution at a temperature within the range of −35° C. to 50° C., filtering, and recovering the resulting ammonium perchlorate by evaporating the filtrate to dryness.

4. The method of making ammonium perchlorate substantially free of occluded water and of at least 90 percent purity which comprises introducing into a pressure reactor approximately equimolar amounts of potassium perchlorate and ammonium chloride and sufficient ammonia to dissolve the ammonium perchlorate produced, causing the reaction to proceed to completion under autogenous pressure, filtering the solution, and recovering the ammonium perchlorate from the filtrate by evaporating it to dryness.

5. The method of making ammonium perchlorate substantially free of occluded water and of at least 90 percent purity which comprises introducing into a pressure reactor approximately equimolar amounts of potassium perchlorate and ammonium chloride and sufficient ammonia to dissolve the ammonium perchlorate produced, causing the reaction to proceed to completion under autogenous pressure, filtering the solution and recovering the ammonium perchlorate from the filtrate by cooling to a temperature of −30° C. to −70° C.

References Cited in the file of this patent

Gmelin-Kraut: "Handbuch der Anorganische Chemie," 8th Ed., vol. 23, pages 196–203 (1936), published by Verlag Chemie, G.m.b.H., Berlin.

Mellor: "Comprehensive Treatise on Inorg. and Theoretical Chem.," Supplement II, part 1, page 609 (1956), Longmans, Green and Co., New York.

Audrieth: "Non-Aqueous Solvents," pages 69, 120 (1953), John Wiley and Sons, New York.